(12) United States Patent
Gasser

(10) Patent No.: US 7,890,794 B1
(45) Date of Patent: Feb. 15, 2011

(54) HANDLING SAS TOPOLOGY PROBLEMS

(75) Inventor: Morrie Gasser, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 289 days.

(21) Appl. No.: 12/241,578

(22) Filed: Sep. 30, 2008

(51) Int. Cl.
*G06F 11/00* (2006.01)

(52) U.S. Cl. .......................... 714/5; 711/159

(58) Field of Classification Search ...................... 714/5
See application file for complete search history.

(56) References Cited

U.S. PATENT DOCUMENTS

| | | | |
|---|---|---|---|
| 7,360,119 B1* | 4/2008 | Stenfort et al. | 714/43 |
| 7,519,854 B2* | 4/2009 | Lucas et al. | 714/9 |
| 7,529,980 B2* | 5/2009 | Henning et al. | 714/41 |
| 7,536,508 B2* | 5/2009 | Davies | 711/114 |
| 7,536,584 B2* | 5/2009 | Davies et al. | 714/5 |
| 7,738,366 B2* | 6/2010 | Uddenberg et al. | 370/229 |
| 2005/0204197 A1* | 9/2005 | Uddenberg et al. | 714/33 |
| 2006/0156055 A1* | 7/2006 | Cherian et al. | 714/4 |
| 2007/0070885 A1* | 3/2007 | Uddenberg et al. | 370/225 |
| 2007/0088978 A1* | 4/2007 | Lucas et al. | 714/9 |
| 2007/0100847 A1* | 5/2007 | Slutz et al. | 707/100 |
| 2007/0220176 A1* | 9/2007 | Henning et al. | 710/1 |
| 2007/0294572 A1* | 12/2007 | Kalwitz et al. | 714/9 |
| 2008/0005470 A1* | 1/2008 | Davies | 711/114 |
| 2008/0010530 A1* | 1/2008 | Davies et al. | 714/31 |
| 2008/0126849 A1* | 5/2008 | Kotzur et al. | 714/7 |
| 2008/0244100 A1* | 10/2008 | Uddenberg et al. | 710/8 |
| 2009/0083587 A1* | 3/2009 | Ng et al. | 714/47 |
| 2009/0313443 A1* | 12/2009 | Stenfort | 711/159 |

* cited by examiner

*Primary Examiner*—Scott T Baderman
*Assistant Examiner*—Kamini Patel
(74) *Attorney, Agent, or Firm*—Krishnendu Gupta; Jason A. Reyes; Phillip W. Citroen

(57) ABSTRACT

A method is used in handling SAS topology problems. It is detected that a chain of SAS expanders has a bad expander that prevents communicating normal SAS data streams along the chain. Expanders are disabled in the chain, and are enabled in turn while updating a flag indicating the most recently enabled good expander, until the chain fails. Expanders are disabled in the chain, and are enabled in turn but the enabling stops after enabling the expander indicated by the flag.

20 Claims, 7 Drawing Sheets

HANDLING SAS TOPOLOGY PROBLEMS

INCORPORATION BY REFERENCE

This patent application incorporates by reference the entire subject matter in copending U.S. patent application Ser. No. 11/238,601 filed Sep. 29, 2005 entitled RAID DATA STORAGE SYSTEM WITH SAS EXPANSION, and in copending U.S. patent application Ser. No. 12/004,167 filed Dec. 20, 2007 entitled MANAGING SAS TOPOLOGY, both assigned to the same assignee as the present invention.

TECHNICAL FIELD

This invention relates to handling SAS topology problems.

BACKGROUND

As is known in the art, it is sometimes desirable that the data storage capacity of the data storage system be expandable. More particularly, a customer may initially require a particular data storage capacity. As the customer's business expands, it would be desirable to correspondingly expand the data storage capacity of the purchased storage system.

Small Computer Systems Interface ("SCSI") is a set of American National Standards Institute ("ANSI") standard electronic interface specification that allow, for example, computers to communicate with peripheral hardware.

SCSI interface transports and commands are used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org. As used herein, reference to SAS devices and protocols may be understood to include SATA devices and protocols.

Such SCSI storage networks are often used in large storage systems having a plurality of disk drives to store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as phys in the terminology of SAS domains. A port may use a single phy or, if the port is configured as a wide port, may use multiple phys logically grouped to provide higher bandwidth. Each phy can support one SAS lane or channel.

In the SAS standard, a logical layer of protocols includes the phy. Each phy is configured for passing data between the SAS device and another device coupled thereto. As used herein, "physical layer", "phy", or "phy layer" all refer to a protocol layer that uses a physical transmission medium used for electronic communication including, but not limited to, the phy layer as specified in the SAS standards.

When a SAS domain starts up, one or more initiator devices perform a "Discovery" process in accordance with the SAS specifications so that each SAS component may generate information indicative of the SAS domain topology. In other words, the SAS Discovery process specified by the SAS specifications permits each SAS device and each SAS expander in the domain to discover information about immediate neighbors coupled to its ports as well as information about other devices and expanders coupled to ports of neighboring components. Thus, each SAS device and SAS expander in a SAS domain may acquire information regarding the overall geometry or topology of the SAS domain.

When a change occurs in the SAS domain, a SAS expander as presently known in the art has only a limited role in adapting devices in the SAS domain to reconfigure for the sensed change. In particular, if a SAS expander senses a change in the SAS domain, as presently known in the art, the SAS expander may issue a BROADCAST(CHANGE) primitive to broadcast to all SAS initiators the fact that some change has occurred. The SAS expander does not inform the SAS initiators what change has been detected. Rather, a SAS initiator that receives the BROADCAST primitive on the SAS communication medium will perform the SAS Discovery process anew. The SAS Discovery process re-discovers all configuration and topological information regarding devices in the SAS domain-whether changed or not changed. Performing a complete SAS Discovery process to detect any change in a SAS domain, even a small change, consumes valuable resources in the SAS initiator and valuable bandwidth in the SAS domain communication paths.

A system relying on SAS expanders can include means to send and receive out of band (OOB) signals over a physical layer. OOB signals can be low-speed signal patterns that do not appear in normal data streams. OOB signals generally consist of defined amounts of idle time followed by defined amounts of burst time. During the burst time, the physical link carries signal transitions. The signals are differentiated by the length of idle time between the burst times. Included in the SATA standard are two predefined OOB signals: COMINIT/COMRESET and COMWAKE. An additional SAS standard-specific OOB signal COMSAS is predefined. The use of these predefined OOB signals, including detection, transmission and reception are defined in section 6.6 of the SAS specification document "Working Draft Serial Attached SCSI-1.1 (SAS-1.1)", revision 9e, 24 Jul. 2005 and published by T10, a technical subcommittee of the International Committee for Information Technology Standards (INCITS) which document is hereby incorporated herein by reference in its entirety.

SAS expanders can be configured to receive SCSI Enclosure Services (SES) pages (also referred to as SES messages) that set and get the various fault detection parameters, that get the status of phys, and that directly enable or disable individual phys. Control and status information, such as SES pages, may be sent via an OOB communication path between the SAS expanders.

SUMMARY

A method is used in handling SAS topology problems. It is detected that a chain of SAS expanders has a bad expander that prevents communicating normal SAS data streams along the chain. Expanders are disabled in the chain, and are enabled in turn while updating a flag indicating the most recently enabled good expander, until the chain fails. Expanders are disabled in the chain, and are enabled in turn but the enabling stops after enabling the expander indicated by the flag.

One or more embodiments of the invention may provide one or more of the following advantages.

SAS expanders may be isolated that are causing problems preventing normal operation of a SAS domain.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

As described below, a technique is provided for use in handling SAS topology problems. In at least one implementation, as described below, the technique may be used to isolate bad expanders in a SAS domain. In particular, the technique may be used to provide a method for isolating SAS expanders that are causing problems preventing normal operation of a SAS domain, using out-of-band signaling and SCSI Enclosure Services (SES) messages. Advantageously, at least one implementation of the technique does not require knowing what the problem is in advance; it only requires identifying when there is a problem.

In accordance with the technique, a recovery procedure described in more detail below isolates a bad expander in a SAS back end (e.g., in a data storage system described below) so that it cannot affect anything occurring upstream of it in the SAS domain. It uses standard SAS mechanisms and SES messages, and does not require the bad expander to cooperate in any way. When a chain has a bad expander that prevents the host from communicating at all on the SAS back end, the host sends a DISABLE message (also referred to herein simply as DISABLE) on its downstream port that is detectable by the first expander, and disables its port so the first expander is blocked from interacting with or being seen by the host. When the first expander gets the DISABLE message, it likewise sends a DISABLE on its downstream port and then disables the port, thereby isolating the second expander. This propagates to the end of the chain so that all expanders have disabled their downstream ports.

Then the host re-enables its downstream port, letting it now see the first expander. The host sends the first expander an ENABLE message, causing the expander to enable its downstream port. When the second expander comes online, the host sends it an ENABLE message. This process repeats as expanders come online, one by one. When the expander prior to the bad one gets the ENABLE message, the bad expander tries to come online. If the expander is still bad this causes the host once again to lose the SAS back end. However this time, the last good expander has saved a FLAG indicator (also referred to herein simply as FLAG) indicating it was the last one that the host enabled. The host repeats the process of sending the DISABLE message and disabling its downstream port, disabling all expanders, and then re-enabling its port and sending ENABLE messages to bring them online. On this second time, the last good expander ignores the ENABLE message because it holds the FLAG. This terminates the process, leaving the bad expander offline.

Figure 1:
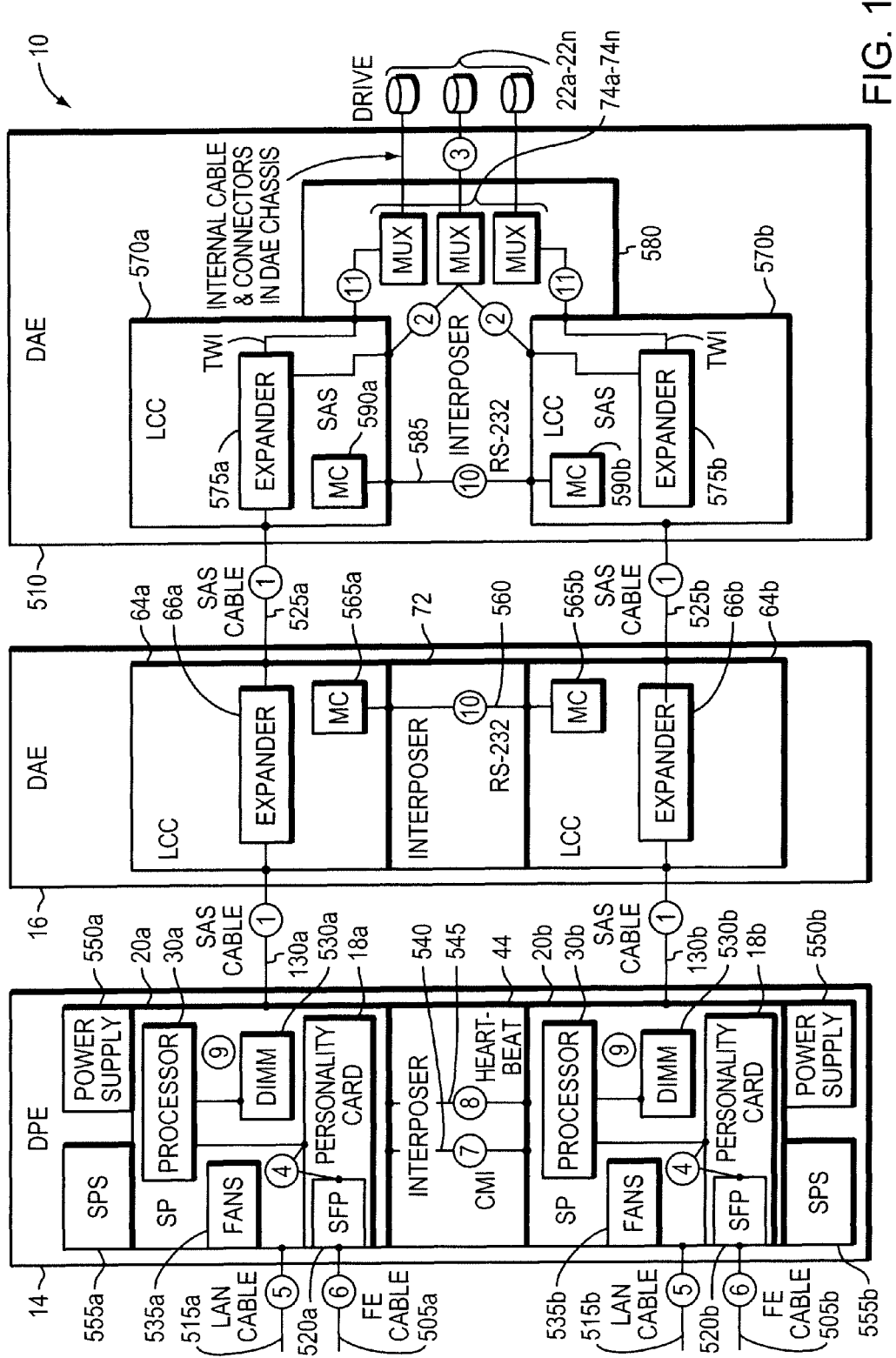
FIG. 1 is a block diagram of a data storage system having SAS features.

Referring now to FIG. 1, for example, the technique may be used in or with a sample data storage system 10. (For the avoidance of doubt, the technique may be used in any or nearly any SAS environment. Also, it is irrelevant to the technique whether there are two storage processors and two link controller cards per enclosure. Furthermore, the technique, when used in a data storage system, only needs one chain of expanders on one "side" of the data storage system, and is not dependent on whether there is a second side with a parallel chain.) System 10 is coupled by a pair of front end (FE) cables 505a, 505b to respective pair of host computer/servers (not shown). System 10 is also coupled by a pair of local area network (LAN) cables 515a, 515b to the respective pair of host computer/servers. The data storage system 10 includes a plurality of, here for example, at least three chassis or enclosures 14, 16, 510 as shown. Enclosure 14 is sometimes referred to herein as a Disk Processor Enclosure (DPE) and each of enclosures 16, 510 is sometimes referred to herein as a Disk Array Enclosure (DAE). DPE 14 includes a pair of front end controllers (also known as personality cards) 18a, 18b having respective Small Form-factor Pluggable (SFP) ports 520a, 520b coupled to the pair of host computer/servers. The DPE 14 also includes a pair of storage processors (SPs) 20a, 20b coupled to each other with storage processor 20a being connected to front end controller 18a and storage processor 20b being connected to front end controller 18b, as shown.

The storage processors 20a, 20b of DPE 14 are connected to the DAE 16 through a pair of SAS cables 130a, 130b, respectively, as shown, and through DAE 16 to DAE 510 through a pair of SAS cables 525a, 525b, respectively, as shown. The DAE 510 includes disk drives 22a-22n.

The DPE 14 is shown to include the pair of storage processors 20a, 20b, each disposed on a corresponding one of a pair of printed circuit boards. Each one of the printed circuit boards has disposed thereon: a processor 30a or 30b, DIMM memory 530a or 530b, and fans 535a or 535b.

The DPE 14 also includes an interposer printed circuit board 44 interconnecting the storage processors with a CMI signal 540 and a heartbeat signal 545, and a pair of power supplies 550a, 550b, and a pair of standby power supplies (SPSs) 555a, 555b.

DAE 16 is shown to include a pair of SAS expander printed circuit boards (also known as link controller cards or LCCs) 64a, 64b, and a pair of SAS expanders 66a, 66b, each one being disposed on a corresponding one of the pair of SAS expander printed circuit boards 64a, 64b.

Also included in DAE 16 is an interposer printed circuit board 72 bearing an RS232 signal 560 between LCCs 64a, 64b. DAE 16 includes a pair of management controllers 565a, 565b, each one being disposed on a corresponding one of the pair of expander printed circuit boards.

DAE 510 is shown to include a pair of LCCs 570*a*, 570*b*, and a pair of SAS expanders 575*a*, 575*b*, each one being disposed on a corresponding one of the pair of LCCs 570*a*, 570*b*.

Also included in DAE 510 is an interposer printed circuit board 580 bearing an RS232 signal 585 between LCCs 570*a*, 570*b*. DAE 510 includes a pair of management controllers 590*a*, 590*b*, each one being disposed on a corresponding one of the pair of LCCs 570*a*, 570*b*.

A plurality of multiplexers 74*a*-74*n* is disposed on the interposer printed circuit board 72, each one of the plurality of multiplexers 74*a*-74*n* being connected to SAS expander 575*a* and to SAS expander 575*b*. The DAE 510 includes, as noted above, the plurality of disk drives 22*a*-22*n*, each one being coupled to one of the plurality of multiplexers 74*a*-74*n*.

In at least one implementation, DPE 14 may have up to 12 disk drives, and each one the DAEs 16, 510 may have up to 12 disk drives each, and two more DAEs having up to 12 disk drives each may be added in a chain from DAE 510, to provide data storage system 10 with up to 60 disk drives. The connections between enclosures use standard SAS signals and cables.

Figure 2:
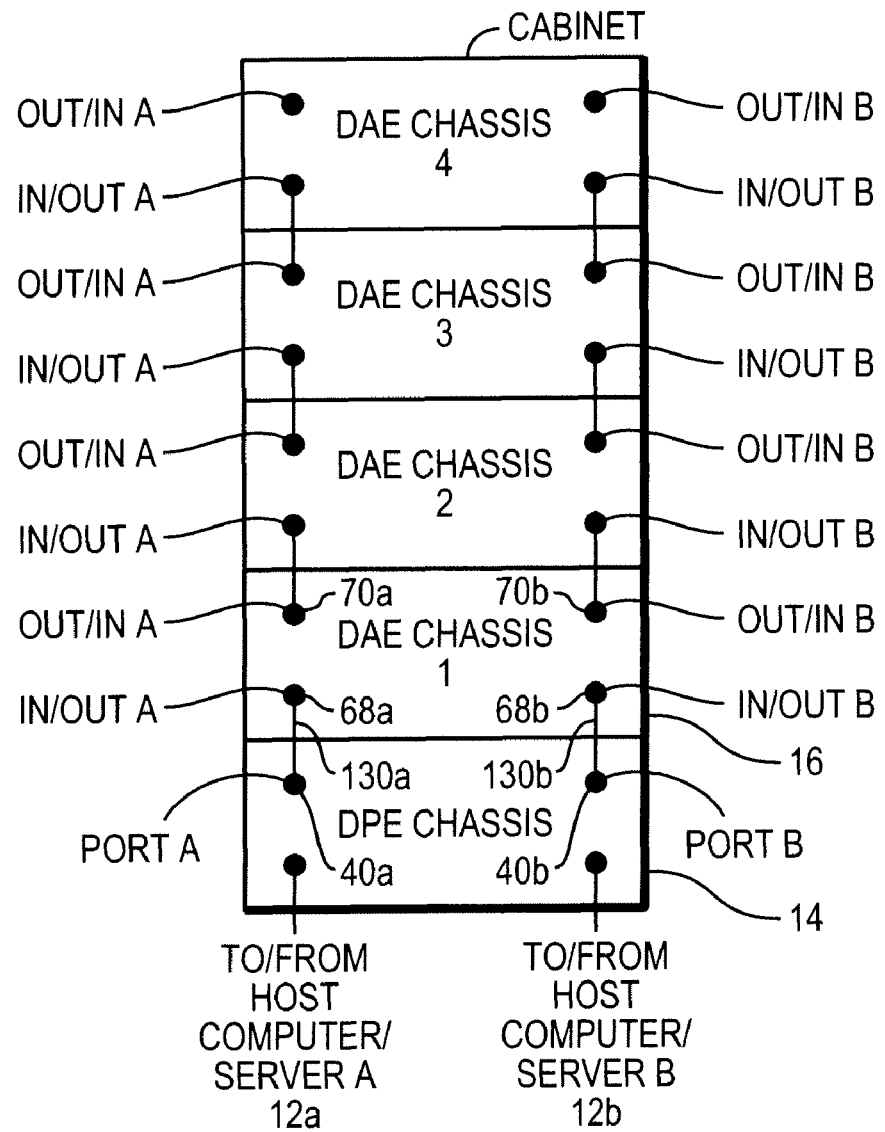
FIG. 2 is a block diagram of features that may be present in the data storage system of FIG. 1.

Data storage system 10 (FIG. 1) may be further expanded as shown in FIG. 2 in a cabinet here having four DAEs including DAE 16 (DAE chassis 1), DAE 510 (DAE chassis 2) and DPE 12 (DPE chassis 0). As noted above, here a DPE has up to 12 disk drives, and each one of the four DAEs has 12 disk drives to provide, in this example, a data storage system having up to 60 disk drives. Enclosures can be wired up in any of multiple ways, one of which is shown in FIG. 2 for use with hosts 12*a*, 12*b*. The connections between enclosures consist of standard SAS signals and cables.

Each one of the cables includes four SAS lanes so that at any one instant in time, at most 4 messages can be going to 4 different drives, but successive messages can be sent to different drives using the same SAS lane. Those 4 lanes are also used to send traffic to drives on downstream expanders, so a message can be sent on one of the input lanes, out one of the 4 output lanes to an input lane on the next box.

Here, in the DPE there are four lanes at each of the expansion ports 40*a*, 40*b*. For each DAE there are four SAS lanes between each one of the ports 70*a*, 70*b* and the connected one of the pair of SAS expanders 64*a*, 64*b*, respectively, and one SAS lane between each multiplexer and a backend SAS port.

In general, at least one implementation of the technique provides an approach for isolating a bad expander in the SAS back end. A bad expander is one that causes a problem that prevents the host (e.g., the SP) from accessing any expanders and drives at all, even those between the host and the bad expander. The problem may be with the expander or with a drive attached to the expander.

One example of this problem is when two expanders in the chain have the same SAS address. In such a case a controller cannot communicate with anything on that back-end chain. There are other cases where an "invalid SAS topology" can be created, preventing the host from accessing the back end. Problems with bad drives can also effectively clog the back end so that no useful traffic can get through.

A goal of an implementation of the technique is to permit normal functioning of enclosures upstream of an enclosure that causes a problem in the topology that would otherwise prevent those enclosures from functioning, regardless of the reason for the problem. The malfunctioning enclosure need not cooperate for this process to work. Another goal is to use only standard SAS and SES (aside from allowed vendor-specific extensions), and to work in single-SP environments.

The following terms are used herein refer to binary functions or conditions that are TRUE or FALSE. Details of how to detect or set each state and condition are described below.

"Phy power off/on" (the state the expander sets on its phy). A powered-off phy appears to both this expander and the neighbor as if there is no cable attached to this phy. A powered-on phy is always either enabled or disabled. A wide port is powered on if at least one phy connected to a neighbor is powered on. A wide port is powered off if all connected phys are powered off.

"Phy disabled/enabled" (the state the expander sets on its powered-on phy). An enabled phy sends periodic COMINIT OOBs (at half-second intervals) to its neighbor until the neighbor phy responds and completes the OOB and phy initialization sequence, and then both phys become ready. If the neighbor phy is disabled or powered off, the enabled phy transmits COMINITs forever and never become ready, which is normal SAS behavior. A disabled phy does not normally send COMINITs. Although it may be powered on, it is invisible to its neighbor and cannot communicate with its neighbor. However, a disabled phy can still send a COMINIT, which its neighbor can detect, and it can detect COMINITs that the neighbor sends. The normal state of a disabled phy as implemented by hardware is not to send COMINITs but to detect incoming COMINITs; however firmware can explicitly send COMINITs on a disabled phy. This is a capability permitted by at least some components. To the neighbor, a disabled phy not sending COMINITs appears the same as a powered off phy. As used herein, the term enabled or disabled means the phy is powered on and capable of sending and detecting COMINITs. This definition extends to a wide port: if a port is disabled, all of its phys are disabled; if a port is enabled, at least one of its phys is enabled.

"Phy ready/not ready" (the state the expander observes on its enabled phy). A ready phy is an enabled phy that is connected to an enabled neighbor phy, and has completed its OOB sequence, speed negotiation and IDENTIFY address frame exchange, so that the two expanders learn each others SAS addresses. Since the term "not ready" applies to any phy that is not ready, regardless of the reason, this includes disabled and powered off phys, or phys attached to disabled or powered-off phys. If a phy is not ready but enabled, and is connected to an enabled neighbor phy, hardware shortly completes the connection and both phys become ready. Therefore, aside from small timing skew, both expanders on the ends of a cable observe the same ready state for their corresponding phys. Phy ready means the phy is enabled.

"CABLE DETECT" (the state the host or expander observes on its cable port). CABLE DETECT means that the neighbor has at least one enabled phy connected to a powered up phy of this expander, or has a disabled phy that is sending periodic COMINITs to a phy of this expander. If the local phy is ready, CABLE DETECT is always true. If the local phy is not ready or disabled, but it sees COMINITs, CABLE DETECT is true. Because receipt of COMINIT is an event rather than a state, CABLE DETECT on a not ready phy or disabled phy remains true as for a period of time after the phy receives COMINIT, and becomes false if another COMINIT is not received within that time. This time depends on the interval at which the neighbor sends COMINITs (as noted above, half-second intervals if the neighbor's phy is enabled). The ability to see CABLE DETECT on an port where the neighbor's phy is disabled is necessary to implement one of the cases in the expander procedure (expander case 5), although the condition need only be maintained until the next ENABLE command. To avoid seeing a false cable pull, an expander monitoring an enabled phy for loss of CABLE DETECT needs to wait long enough to check for COMINITs after a phy transitions from ready to not ready, because the COMINIT method of sending DISABLE (described herein) uses this state.

The following is an event, not a state:

"SAS LOST" (an event a host observes on a controller port). This means the host has lost (or never had) the ability to see the first expander, but it knows or believes one is plugged in. This is the event that triggers the host to initiate the recovery procedure.

The flow of a procedure of an example implementation of the technique is as follows.

In a chain of expanders, all expanders are in their normal power-up and steady-state mode: all phys of all ports powered up and enabled. If a new chain of expanders in this state comes online and they are all good, nothing special happens.

Recovery is triggered when the host sees the SAS LOST condition due to a bad expander somewhere in the chain, either on a cable insert or if an expander suddenly goes bad. Recovery involves two rounds of operations, identical from the host's perspective:

Recovery Round 1

The host sends a DISABLE command (to be described below) on the downstream port of its controller and disables the port. The first expander detects this DISABLE, and repeats the same operation on its downstream port, sending DISABLE to the next expander, and this continues down to the end of the chain so that all expanders have disabled their downstream ports (except the last one, which is not plugged into anything).

The host re-enables the downstream port of its controller. As a result, the host discovers the first expander (if it is good) and starts sending a series of ENABLE messages that cause expanders down the chain to re-enable their downstream ports and come online one by one. The ENABLE causes each expander to get or reset a FLAG telling it whether it is the last one on the chain currently visible to the host. The procedure helps ensure only one expander has the FLAG at a time, so the FLAG in effect propagates downstream, always set in the last expander to come online. When the bad expander finally comes online, the host detects SAS LOST again. At this point the expander just prior to the bad one (the last one to receive the ENABLE command) has the FLAG.

Recovery Round 2

In response to SAS LOST the host implements recovery round 2 by again sending a DISABLE to the first expander and disabling its downstream port, repeating entire process a second time, sending ENABLEs one by one as it sees expanders come online. But this time, the last good expander, because it already has the FLAG, ignores this second ENABLE. Since no new expander comes online as a result, the host sees no more expanders and is done with the procedure, while the bad expander remains isolated.

In accordance with the procedure, the host has no need to maintain any state about what it has seen and done, since all necessary state is embodied in the position of the FLAG which is saved by the appropriate expander. The host does not even need to know which round of recovery it is running, since all host actions are triggered by one of two events: SAS LOST or a new expander being discovered. The host's only response to SAS LOST is to send a DISABLE and to toggle the enabled state of its controller port, and the host's response to seeing a new expander is to send a single ENABLE message to each expander. The host does not need to read the expander state and the procedure is self-limiting, terminating exactly when all expanders prior to the bad one are online. In at least some cases, after sending the DISABLE, the host does not even need to keep track of the fact that it is in the middle of any recovery procedure, because the host's action when seeing a new expander come online (to send it an ENABLE) could be the same regardless of whether the host was implementing this recovery procedure or just bringing a newly discovered expander online normally.

At least some of the complications of this procedure are due to the fact that expanders maintain some state (i.e., their disabled condition and the FLAG) that needs to be cleared if the back end changes, either after recovery when there is a bad expander, or during recovery. The user could replace the bad expander with a good one, or sub-chain of good expanders containing a bad one, and without extra mechanisms, the newly added good expanders might not become visible to the host. The procedure addresses timing windows using a fairly simple set of rules implemented in expanders and propagating the CABLE DETECT condition up and down the chain whenever a cable is removed, to clear the states in any expanders participating in recovery.

DISABLE Command

The procedure defines a DISABLE command that a controller or expander can send to its downstream neighbor in conjunction with disabling its downstream port, which the neighboring expander (if operating normally) can reliably detect. (It does not matter whether the DISABLE comes before, during or after disabling the port.) In fact, DISABLE does not need to be a discrete command, but could be a state that continues to persist as long as the port is disabled.

The procedure specifies that the DISABLE signal be transmitted after disabling the downstream port by sending COMINITs on all the phys at regularly spaced intervals, more often than the interval at which an enabled phy normally transmits COMINITs when trying to make a connection to its neighbor (which is a half second). The neighbor, if any of its upstream phys are enabled, treats receipt of more than 2 or 3 of these COMINITs on any phy, without the phy becoming ready, as a DISABLE command. Transmitting COMINITs more often than a half second shortens the time it takes for the neighbor to detect DISABLE, speeding up the whole recovery procedure, although half a second could be used, too. It is harmless if the DISABLE condition continues to persist as long as the upstream expander's port is disabled.

Use of COMINIT to signal DISABLE has the added benefit that COMINIT is also what the expander needs to observe to monitor the CABLE DETECT condition on the downstream port, a requirement for expander case 5.

There are a number of other ways to signal a DISABLE that do not require an OOB, which could be used if expander case 5 is not considered mandatory, and nothing else in this procedure would change if one of these other mechanisms are used.

An important characteristic for any DISABLE mechanism is that the expander receiving a DISABLE on an upstream port be able to distinguish it from a from pulled cable or powering off the upstream neighbor. Therefore in at least some implementations the act of disabling downstream phys without sending COMINIT (which looks like a missing cable) cannot itself be used to implement the DISABLE command. (This is to prevent an expander from becoming DISABLED while it has a FLAG set, except when the immediately downstream expander is bad. If an expander were to become DISALBLED simply by pulling the upstream cable, and that happened while its FLAG was set, then the expander would not enable its downstream port when the host next sends an ENABLE.)

Here are some other possible mechanisms for DISABLE:

1. Issue a custom SMP message just prior to disabling the port that firmware interprets as a DISABLE command. There are a number of vendor-specific SMP function codes available for use.

2. Issue a standard SMP message with custom options. For example, there is an SMP message to write a GPIO register, where one could define a custom register or issue an SMP message to operate on a phy that does not exist.

3. A characteristic of each of the SMP mechanisms above is that it requires SMP to work for at least one hop. Even though such an SMP message does not require routing, it is possible that a bad expander downstream of the neighbor may be doing something that prevents even non-routed SMP messages from getting through to a neighbor. For example, the bad downstream expander could be dominating all the SAS lanes. To reduce such problems, one could use a SAS primitive such as a NOTIFY (ENABLE SPINUP) or one of the reserved NOTIFY primitives, that would not make sense for an expander-to-expander link, to signal a DISABLE.

In at least some implementations, all of the above approaches require the DISABLE command to be sent before the phy is disabled. This requires a short timer after issuing the command, or waiting for a command response, to be sure the neighbor received the command before disabling the phy. Unlike the COMINIT method, the use of a discrete command to signal DISABLE means it is a one-shot event that does not persist, and the mechanism needs to help ensure the downstream expander will not miss the event.

The procedure does not require the DISABLE command to be received or handled by the bad expander—only good expanders upstream of the bad one need to process it.

Expander States and Variables

Expander firmware is in one of two mutually exclusive states, ENABLED or DISABLED, that the expander can set on its own or on command from the host. The state describes the downstream port of the expander and affects how the expander responds to events. This state only affects downstream behavior and does not affect whether the host can see this expander.

This is what happens on a state transition:

DISABLED to ENABLED: The expander enables all of its downstream phys, except those disabled by the low level flaky phy monitor in the expander. The expander may do this on its own or on receipt of an ENABLE command from the host.

ENABLED to DISABLED: The expander disables all of its downstream phys and sends a DISABLE message to the downstream neighbor. The expander does this on its own when it gets a DISABLE message from its upstream neighbor. The procedure here is not dependent on whether the DISABLE message comes before, at the same time as, or after the port is disabled, or whether DISABLE is a condition that persists the entire time the downstream phys are disabled. These are treated as if they occurred simultaneously but a variable time skew is acceptable.

It follows from the above that if the flaky phy monitor disables all the downstream phys (highly unlikely), the above transitions have no effect on the phy states. (If the method of sending DISABLE uses COMINIT as primarily described herein, this assumes that when the flaky phy monitor disables a phy, it does not permit that phy to send COMINITs. A disabled phy could be allowed to send the DISABLE command via COMINITs without causing any harm, but it would be pointless when all the phys have been disabled due to errors because nothing downstream of this expander is accessible anyway.) However, the expander still remembers its ENABLE/DISABLED state independent of the phy monitor.

The effect of the states is that when an expander is DISABLED and all upstream expanders are ENABLED, expanders downstream of it are invisible to the host, while the expander, its drives, and devices upstream of it remain accessible. The downstream expander (if plugged in), has received a DISABLE message on its upstream port (and will likewise disable itself), propagating the condition down the end of the chain at least as far as the bad expander.

When an expander is ENABLED, the expander downstream of it (if powered up) soon becomes visible to the host, unless it is bad or has disabled all its upstream phys due to the flaky phy monitor.

An expander always powers up ENABLED.

The expander maintains the following boolean states.

FLAG: This boolean controls how the expander responds to a host's ENABLE command. If set, ENABLE just clears the FLAG and sets the ASSIGNED state. If not set and DISABLED is set, ENABLE sets ENABLED, FLAG, and ASSIGNED. The expander also clears this FLAG on its own when a number of conditions occur that indicate the back end has changed since the last ENABLE. The host and expanders implement a procedure to help ensure that at most one expander in a chain currently visible to the host has the FLAG set.

During recovery round 1, the FLAG gets set on each expander in turn, up to the last good expander. Only one expander has the FLAG set at a time, and when round 1 ends the last good expander is holding the FLAG. During recovery round 2, the same thing happens, but in addition the last good expander also has the FLAG. Round 2 ends when the last good expander gets an ENABLE command.

An expander always powers up with FLAG=FALSE.

ASSIGNED: The expander sets this flag whenever it receives an ENABLE command from the host, regardless of the state of FLAG. The expander clears this flag when it sets itself DISABLED, or when upstream or downstream CABLE DETECT is FALSE. This flag controls whether the expander propagates a loss of downstream CABLE DETECT back upstream, behavior required to reset the expander state after a back-end change (see expander case 4). In effect, ASSIGNED means the expander is visible to the host and that the host has acknowledged its presence. An ASSIGNED expander might be in use by the host for I/O.

ASSIGNED is not the same as ENABLED, because the expander may enable itself on its own, which does not set ASSIGNED. Also an expander may be ASSIGNED but DISABLED, if its FLAG was set when it received an ENABLE command.

An expander always powers up with ASSIGNED=FALSE.

SES Command

Here defined is the following command that the host may issue to an expander, via a vendor-specific SES page.

ENABLE When an expander receives this, it always sets ASSIGNED=TRUE.

In addition:

If the expander is DISABLED and FLAG=FALSE, it tells expander to set ENABLED and FLAG=TRUE.

If the expander's FLAG=TRUE, the expander just sets FLAG=FALSE.

An expander that received an ENABLE command once (i.e., it gets ASSIGNED) is considered active and in use by the host. The procedure helps ensure that an ASSIGNED expander will not go offline due to a cabling action downstream of this expander, providing no expanders are bad.

Since the recovery procedure does not require the host to observe any expander states, no SES status requests are defined for the purposes of this procedure. However, such a status facility may be provided for convenience.

Expander Procedure

The expander's procedure involves monitoring a number of conditions and changing its state accordingly.

Expander Case 1. If DISABLE received from upstream neighbor:

If downstream CABLE DETECT=TRUE, set DISABLED by disabling downstream port, and send DISABLE on the downstream port.

Set ASSIGNED=FALSE.

The upstream expander or controller has told us to DISABLE and has disabled all its downstream phys. This is what the host initiates on the chain each time it detects SAS LOST, prior to beginning recovery round 1. In the case where DISABLE is a state and not a one-shot command as in the COMINIT implementation discussed herein, the expander enters this case as soon as it detects the DISABLE state.

Because the expander forwards the DISABLE downstream, this condition propagates to the end of the chain. This ensures that each time the host gets SAS LOST, all expanders except the last one are DISABLED.

If this expander's FLAG is set when it gets a DISABLE, FLAG remains set, causing a subsequent ENABLE to be ignored except for clearing FLAG (step 3b below). The state (DISABLED & FLAG=TRUE) is expected to be transient, persisting only between the end of recovery round 1 when the host sends it the first ENABLE, and the end of round 2 when the host sends it another ENABLE. However if the host goes down after sending the first ENABLE, this state could persist indefinitely (unless expander case 5 below is invoked due to loss of CABLE DETECT as a result of the host going down).

Expander Case 2. At power up:

Set ENABLED by enabling downstream port.

Set FLAG=FALSE.

Set ASSIGNED=FALSE.

This is the normal power-up state.

Expander Case 3. If ENABLE command received from host:

3a. If ASSIGNED=FALSE, set ASSIGNED=TRUE.

3b. If FLAG=TRUE, set FLAG=FALSE.

3c. Else if FLAG=FALSE and DISABLED: Wait to make sure at least a period time has passed since setting DISABLED in expander case 1. Set ENABLED by enabling downstream port. Set FLAG=TRUE.

Whenever one or more new expanders come online, the host sends ENABLE to all expanders it sees, in connectivity order, even those previously discovered. This could happen during recovery, but also at normal discovery time. All expanders that are already ENABLED will just set ASSIGNED (step 3a) clear their FLAG, if set (step 3b). Since the state for an expander at power on is ENABLED, this is the normal behavior at discovery. If a recovery is in progress, this is also the behavior of all expanders during round 1, and of all but the last expander in round 2.

Special handling applies only to the last expander when it is DISABLED, which means that a recovery is in process or was completed. The last expander, if DISABLED but without its FLAG set, also becomes ASSIGNED (step 3a) and ENABLED, but in addition, sets its FLAG (step 3c). This happens in the recovery round 1. The act of enabling the downstream port in step 3c brings the next expander online. But if the last expander is DISABLED and has a FLAG, it will just clear its FLAG and stay DISABLED (step 3b). This happens in recovery round 2, but only to the last expander prior to the bad one. It means that the downstream expander is bad and should not be brought online.

The period wait since case 1 in step 3c is needed to make sure that the downstream neighbor has had time to run its own case 1 and disable its downstream port, before this expander re-enables itself. This expander needs to be sure that when it re-enables its port, all it sees is its neighbor, not expanders downstream of it. An actual wait is unlikely to be needed to implement this delay, because the time for the neighbor to notice the DISABLE is much shorter than the time by which the host will send an ENABLE, so it is just protection against a very unlikely scenario.

Expander Case 4. Downstream CABLE DETECT transitions to FALSE:

4 a. Set ENABLED by enabling downstream port. Set FLAG=FALSE.

4 b. If not ASSIGNED, toggle power state of upstream phys (i.e., power down, wait a period, and power up). The upstream expander determines that the cable has been momentarily disconnected and enters this case as well.

This case does not occur during recovery, but is provided to restore expanders to their power-on states when a downstream cable is disconnected, thereby clearing any states set as a result of a recovery in progress or previously completed. This case affects all expanders upstream of a removed cable, up to the last ASSIGNED expander.

Step 4a handles the last good expander in a chain prior to a bad one, when the bad expander is unplugged after a recovery has completed. After recovery, this last good expander is left DISABLED, so if a new (good) neighbor is connected in place of the bad one, the new expander would never be seen. This step re-enables the expander's downstream ports Step 4b is needed if a cable is swapped removed in the middle of a recovery process, to propagate the loss of CABLE DETECT upstream and reset all expanders participating in the process, up to the last one ASSIGNED. There is a timing window where a sub-chain containing a bad expander is unplugged during recovery round 1, while the expander at the end of the remaining chain is DISABLED and an ENABLED expander prior to it has the FLAG. Step 4a would enable the DISABLED expander on the end of the remaining chain, but the FLAG would still be present on that upstream expander. If a sub-chain containing ENABLED good expanders followed by a bad expander is plugged into the end of the existing chain while recovery round 1 is still running, round 1 will end either immediately (of there are no DISABLED expanders) or as soon as the last DISABLED expander is ENABLED, due to SAS LOST caused by the bad expander. This leaves the FLAG set at that expander rather than propagating the FLAG to the last expander prior to the bad one. Recovery round 2 then stops at that expander with the FLAG, thereby failing to bring online any good expanders after it.

Step 4b applies only to expanders not yet ASSIGNED, because we do not want to perturb the fabric upstream of expanders that are already accepted and possibly in use by the host. The "wait a period" in step 4b should be long enough to help ensure that the upstream expander sees the loss of the cable. The timing is not very critical and waiting as long as a few seconds is sufficient.

Step 4a could be considered a steady-state condition that holds whenever downstream CABLE DETECT=FALSE, although it is sufficient to invoke the action only on a transition into that state, since expander case 1 checks CABLE DETECT before implementing any action that would alter the settings made in step 4a. Step 4b, on the other hand, should only be invoked once on each loss of CABLE DETECT.

Expander Case 5. Upstream CABLE DETECT transitions to FALSE:

5 a. Set ENABLED by enabling all downstream phys. Set FLAG=FALSE.

5 b. Toggle power state of downstream phys (i.e., power down, wait a period, and power up). The downstream expander determines the cable has been momentarily disconnected and enters this case as well.

This case does not occur during recovery, but is provided to restore expanders to their power-on states when an upstream cable is disconnected, thereby clearing any states set as a result of a recovery in progress or previously completed. This case affects all expanders downstream of a removed cable.

A purpose of this case is to reset to their default state any expanders left in a state where DISABLED and FLAG are both set (which would cause them to execute step 3b on the next ENABLE). It handles the low probability situation in which this expander receives an ENABLE (thereby setting ENABLED and FLAG in step 3c) and then a previously good expander upstream of this expander suddenly goes bad before the host has a chance to send this expander a second ENABLE to clear the FLAG in step 3b. The host would experience SAS LOST and send a DISABLE that propagates down the chain, leaving this expander DISABLED with its FLAG set. If this sub-chain of expanders is disconnected from the upstream bad expander and attached to a new host, when the new host discovers this expander and sends ENABLE, this expander (still DISABLED and holding the FLAG) invokes step 3b without enabling itself, preventing the likely good downstream expanders from coming online.

This case only makes sense to check if the expander can distinguish a disabled port of an upstream expander from a missing cable. It is important that this case is not be invoked when the upstream expander is DISABLED while the cable is still plugged in. For this reason, a DISABLED expander must periodically send COMINITs to its downstream port until it gets an ENABLE command, even if it does not implement COMINIT to communicate the DISABLE command as suggested herein, to prevent the neighbor from determining the cable has been removed. If the expander then executes step 3c in recovery round 1 and sets itself to ENABLED, at least one downstream phy becomes ready and COMINIT is no longer needed to maintain CABLE DETECT. If it executes step 3b in recovery round 2, where it stays DISABLED, it is harmless to continue sending COMINITs because in that case the downstream neighbor is bad and will not come online anyway.

Step 5a describes a steady-state condition whenever the upstream CABLE DETECT=FALSE, although it is sufficient to invoke it only on a transition into that state. Step 5b is an action that should occur only a transition.

Notice that, except for check for ASSIGNED in step 4b, the behaviors in cases 4 and 5 are exactly symmetrical. In fact, a check for ASSIGNED added to step 5b would not cause any harm, so the software code implementing these cases can behave identically regardless of whether it was monitoring the upstream or downstream port. The result of all this is that any cable disconnect always propagates in both directions down the chain, resetting all expanders and terminating only when it arrives at an ASSIGNED expander.

Host Procedure

Similar in behavior to the expander, the host's procedure involves reacting to a number of conditions that it continuously monitors.

Host Case 1. If SAS LOST occurs:

Something bad has happened to the back end, so start the recovery procedure by toggling the enabled state of the downstream port of the controller to disable all expanders in the chain:

1 a. Send DISABLE on downstream port of controller, disable downstream port, and pause for short time (a specified value).

The pause, a few seconds, is to make sure that the host's discovery mechanism has time to notice that the expander has gone offline, and to give the first expander time to disable its own downstream port after receiving the DISABLE. This is the same delay as in expander case 3c, to help ensure that when the host re-enables its phys, all it sees is the first expander. The disable propagates down the chain because of expander case 1.

1 b. Enable downstream port of controller.

When the enable happens after 1a, only the first expander in the chain comes online (assuming it is good) which the host detects in case 2 below. Or, if the first expander is bad, it will not come online and there is nothing left to do in this procedure. Note that the host does not have to wait until the DISABLE condition from 1a has propagated to the end of the chain before carrying out this step—the host only attends to whether the first expander has enough time to see the condition.

Soon after this step, the host sees the first expander (and possibly others) come online, thus provoking case 2.

Host Case 2. If host sees one or more new expander(s) come online.

2a. Host completes discovery of new expander(s).

Either a new expander was just plugged in or powered up (in which case FLAG=FALSE and ENABLE=TRUE on that new expander due to expander case 2), or a new expander came online as a result of the host sending ENABLE to the previous expander in step 2b below during round 1 or recovery round 2. SAS LOST has not just occurred or the procedure would not reach this point.

2b. Send ENABLE to all expanders, both new and old. This behavior occurs whether or not recovery is in progress, although it is effectively a no-op except during recovery. The order is unimportant, except that the expander on the end of the chain must receive the command last. The command has no effect on expanders previously ASSIGNED who do not have a FLAG set. The only previously discovered expander that could have a FLAG set is the previous last expander, which will simply clear its FLAG.

The ENABLE commands can be sent to expanders any time before, after, or during the normal process of bringing enclosures online (e.g., setting LCC states, enclosure numbers) since this recovery procedure is independent of those operations. However it probably should not be delayed too long because it will extend the time it takes for a chain of disabled expanders to come back online during each round of recovery. However, to give a bad expander enough time to "go bad", it may make sense to delay sending ENABLE to expanders for a little while after they first come online—see Oscillating Good/Bad Expander discussion below for a use case.

The last expander must receive ENABLE last, in order to make sure that any FLAG in expanders prior to it set during recovery round 1 are cleared. In case ENABLE on the last expander causes SAS LOST (because of a bad downstream expander), this order helps ensure that only that last expander has its FLAG set in recovery round 1.

Due to timing windows, the easiest way to help guarantee that the last expander gets the last ENABLE is to send the command to the expanders in connectivity order, waiting for a success from each expander before sending to the next one. This approach does not rely on whether one of the new expanders happens to appear in the middle of an existing chain (a possibility only if the host missed seeing some of its expanders go offline). If the topology changes at any time during case 2 (whether an expander is added or removed), the host will just repeat case 2 from the beginning. The host does not send ENABLE to the last expander until it has send ENABLE to every prior expander since the last time a new expander appeared in the chain.

Sending an ENABLE to the last expander might bring additional expanders online. If so, that means the host repeats case 2, sending ENABLE again all expanders. Therefore if the chain starts out with 5 DISABLED expanders, the host will send 15 ENABLE commands (1+2+3+4+5) to get them all ENABLED. While it is useless to send ENABLE to an expander that was already ASSIGNED (except for the previous last expander whose FLAG might be set), the process is much simpler if the host just does all of them on each new discovery of any expander. This avoids the need for the host to keep track of which round of recovery it is in and which expanders are already ENABLED and might have the FLAG. The host could first query each expander to see if it has the FLAG, but it's probably just as easy to send the ENABLE command regardless of the FLAG.

If all new expanders are already ENABLED and good (the normal case), case 2 runs but has no effect, other than to set ASSIGNED and clear any FLAGs that are set. This is true regardless of how they came online.

Notice that nothing in the host's behavior described above requires the host to know it is in recovery or what round of recovery it is in. Correctness of this procedure does not require the host to maintain a state machine or memory of prior actions on expanders, even during the recovery process, because the only state that needs to be remembered is which expanders are ASSIGNED and which have the FLAG, and these are remembered by the expanders—not by the host. The host doesn't have to read any expander states, since its actions are entirely driven by SAS LOST and discovery events.

In an operating system (OS) environment it is useful for the host to know when recovery starts (with case 1 above) and when recovery ends (with the last ENABLE sent to the expander whose FLAG is set). This is because the operating system can then suspend back-end I/O during a recovery to avoid rebuilds and undesirable enclosure state machine behavior as enclosures and drives come and go repeatedly. The previous state of the FLAG is returned to the host in a SES page, or as a special status in response to ENABLE (e.g., a CHECK CONDITION with a certain sense key to indicate ENABLE was ignored). If the host detects that the FLAG was already set prior to sending the ENABLE, it means recovery is done.

But if the host uses the previous state of the FLAG in an enclosure to determine when recovery has completed, the host must be careful to handle cases where enclosures are unplugged or changed during recovery, in such a way that it never sees an enclosure with the FLAG and thus never thinks recovery round 2 is done. This would be the case if the enclosure with the FLAG was removed, replaced or reset, and the bad enclosure beyond it no longer exists in the chain. This could be done by using a timeout (e.g., if no new enclosure shows up within a certain time after an ENABLE, assume recovery is done) or the host could examine the downstream cable status (via SES) to determine if anything is connected to an enclosure that doesn't have its FLAG set. Another possibility, if the mechanism is used to return a special CHECK CONDITION on ENABLE when the FLAG is set, is to return that same CHECK CONDITION in the case of no downstream connection, acting just as if the FLAG was set. This helps ensures the host knows the procedure is done at the last physical expander in the chain. However it still does not handle the case where the next expander is detected but will not come up, so in at least some implementations the host needs a timeout anyway.

Note that round 2 of the recovery procedure terminates with the last good expander whether or not the host is aware of that.

Invariant

The host and expander procedures result in one important invariant relative to an expander:

If DISABLED and FLAG=TRUE, the downstream neighbor is bad.

This invariant is important because, if an expander could be in this state while its downstream neighbor is good, and a host sends it an ENABLE (host step 2b), the downstream neighbor will never be brought online (because the FLAG prevents expander step 3c from being run). Also, note that the state (DISABLED and FLAG=TRUE) is normally transient, as noted in expander case 1 on page 7, so there are only brief periods of time when this invariant is relevant.

This invariant normally holds because the only way the FLAG will transition to TRUE is when ENABLED also is set (expander step 3c), and the only time ENABLED can be turned off without turning off the FLAG is when the host sends a DISABLE, which it does only after detecting SAS LOST due to a bad expander. Therefore, it can be determined that the reason for SAS LOST was that the expander downstream of the one that just received an ENABLE was bad.

The following occurs if an expander upstream of a just-enabled expander went bad after it received ENABLE, but before the host got a chance to send another ENABLE after discovering the new downstream neighbor. The host sees SAS LOST, sends DISABLE, and now the last-enabled expander is left in a state with DISABLED and FLAG=TRUE even though its downstream neighbor could be good, thereby violating the invariant.

It turns out, violating this invariant is not a problem while the expander remains attached to this chain of expanders, because if the upstream expander was bad, the host would never get far enough in its recovery procedure to attempt to enable this expander. It only matters if some part of the chain between the bad upstream expander and this expander is reattached to a chain that has no bad upstream expander. To prevent that, expander step 5 propagates cable disconnects downstream, resetting the FLAG in any expander when an upstream expander or controller is disconnected, reset or powered off. In at least some implementations, this mechanism only works if the CABLE DETECT logic on the upstream port can distinguish between a disabled neighbor phy and a disconnected or powered off phy.

Use Cases

Figure 3:
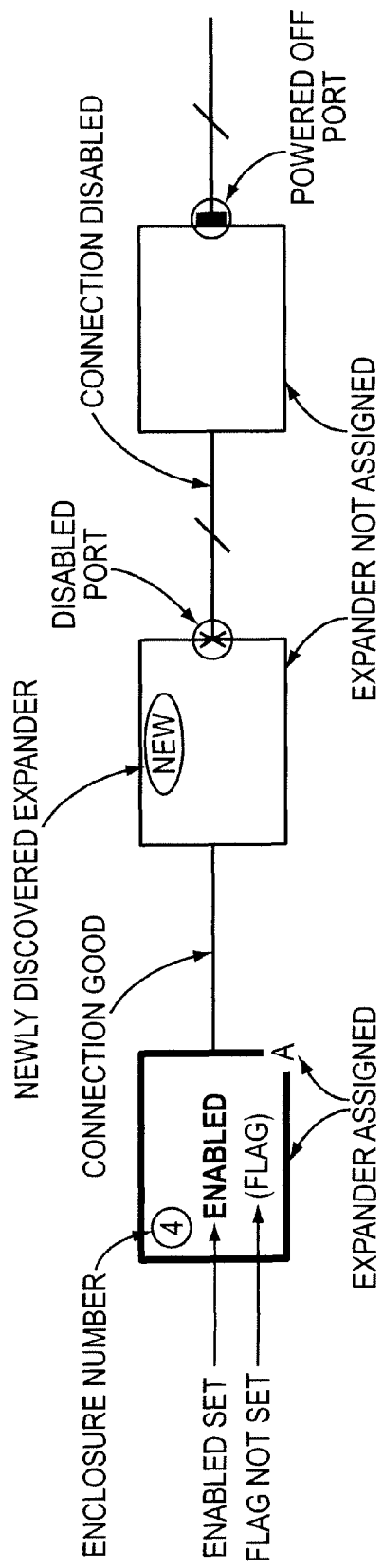
FIGS. 3-5 are diagrams illustrating techniques that may be used with the SAS features of FIGS. 1-2.

The following describes some use cases to illustrate how the procedure works. FIG. 3 illustrates and explains notations used in FIGS. 4A, 4B, 5 described below. Enclosure number is provided in the upper left corner. If the expander is ASSIGNED, this is indicated by an "A" in the lower right corner and/or a thick border. "FLAG" denotes FLAG is set, "(FLAG)" denotes FLAG not set. A connection that is good is denoted by a thick line without hash marks. A connection that is disabled is denoted by a thick line with one hash mark. A disabled port is denoted by an X, and powered off port is denoted by a block. A newly discovered expander is denoted by "NEW".

Expander Goes Bad or Bad Expander is Plugged in

Figure 4A:
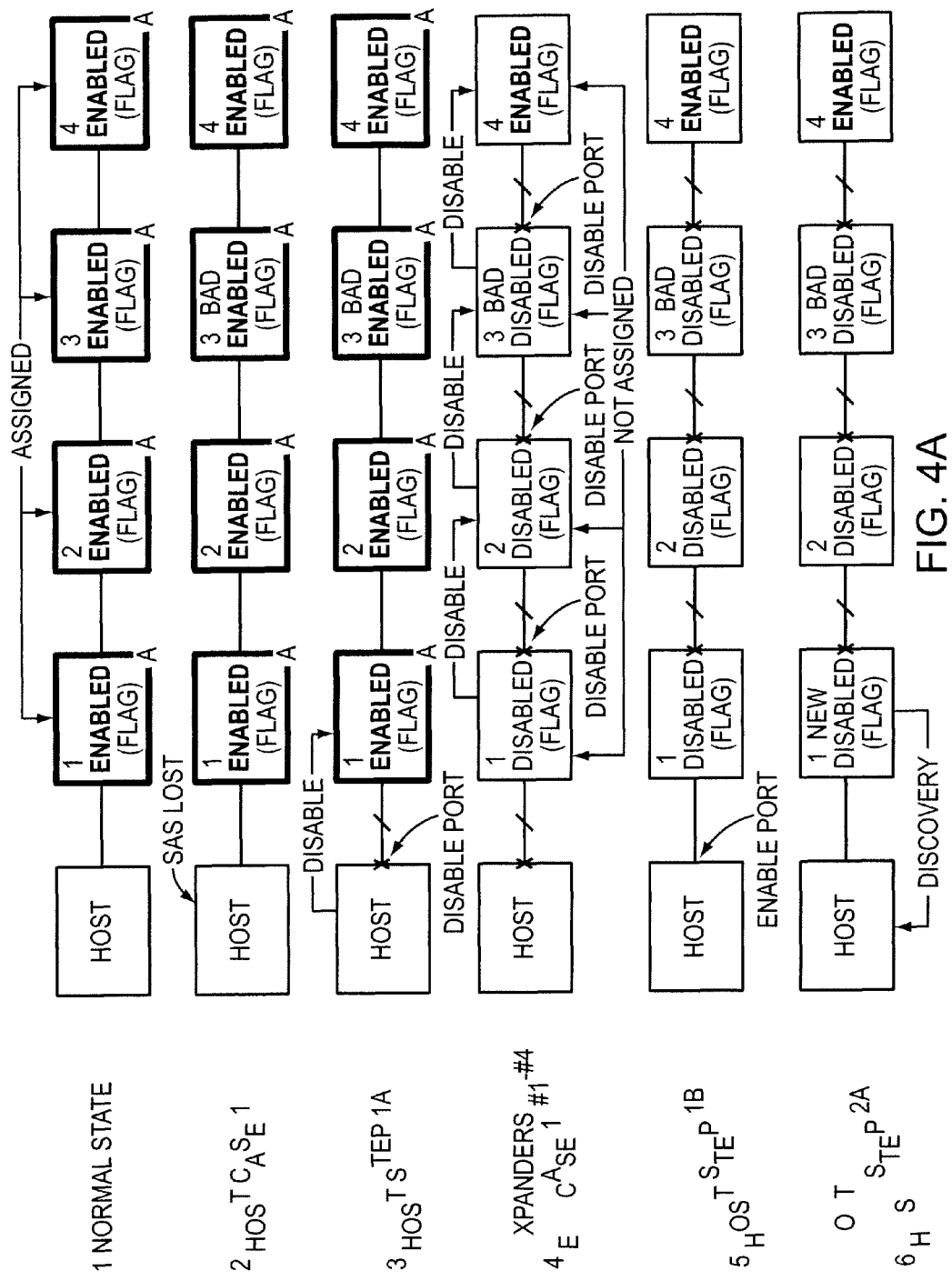
Figure 4B:
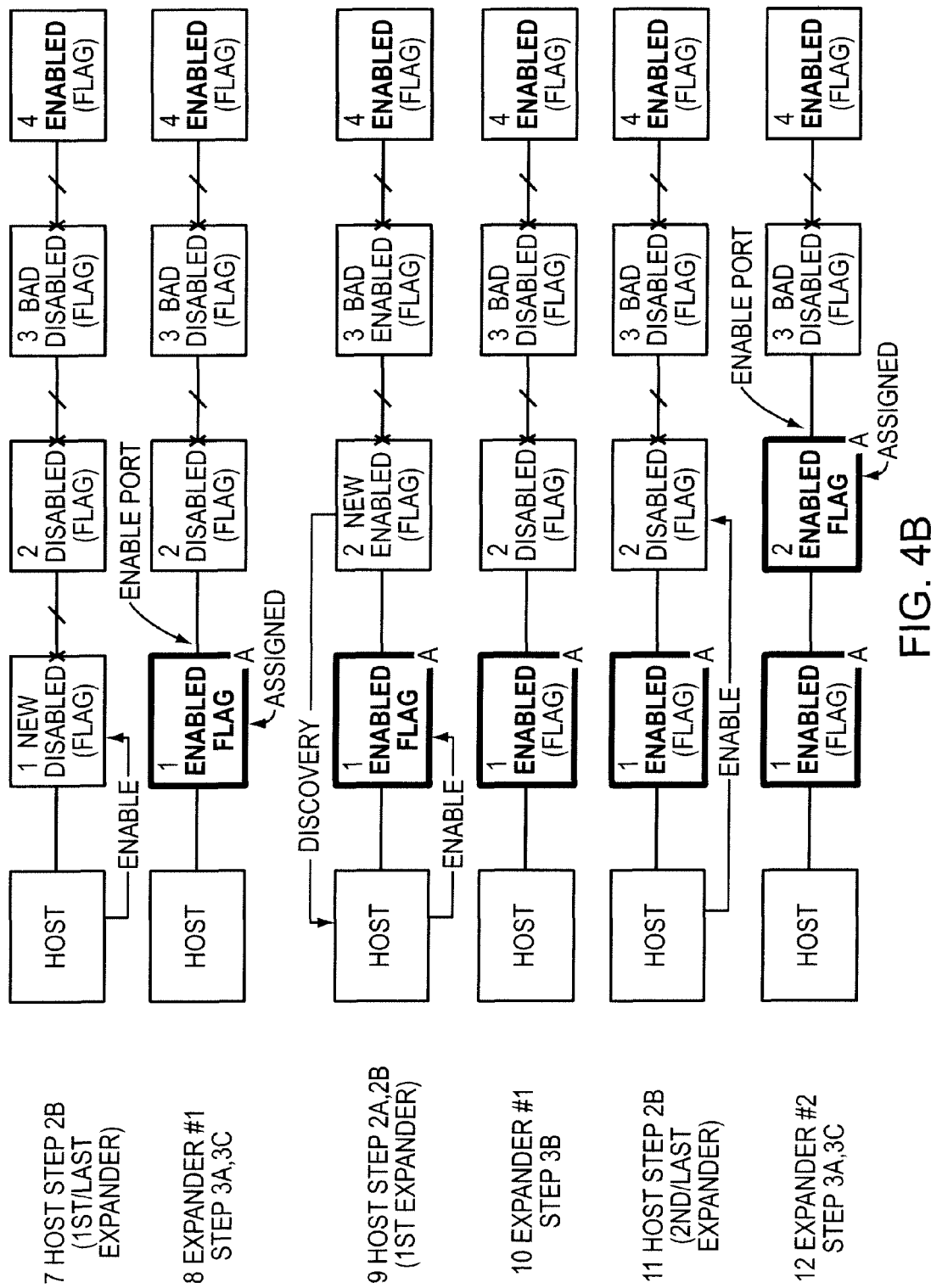
Figure 4C:
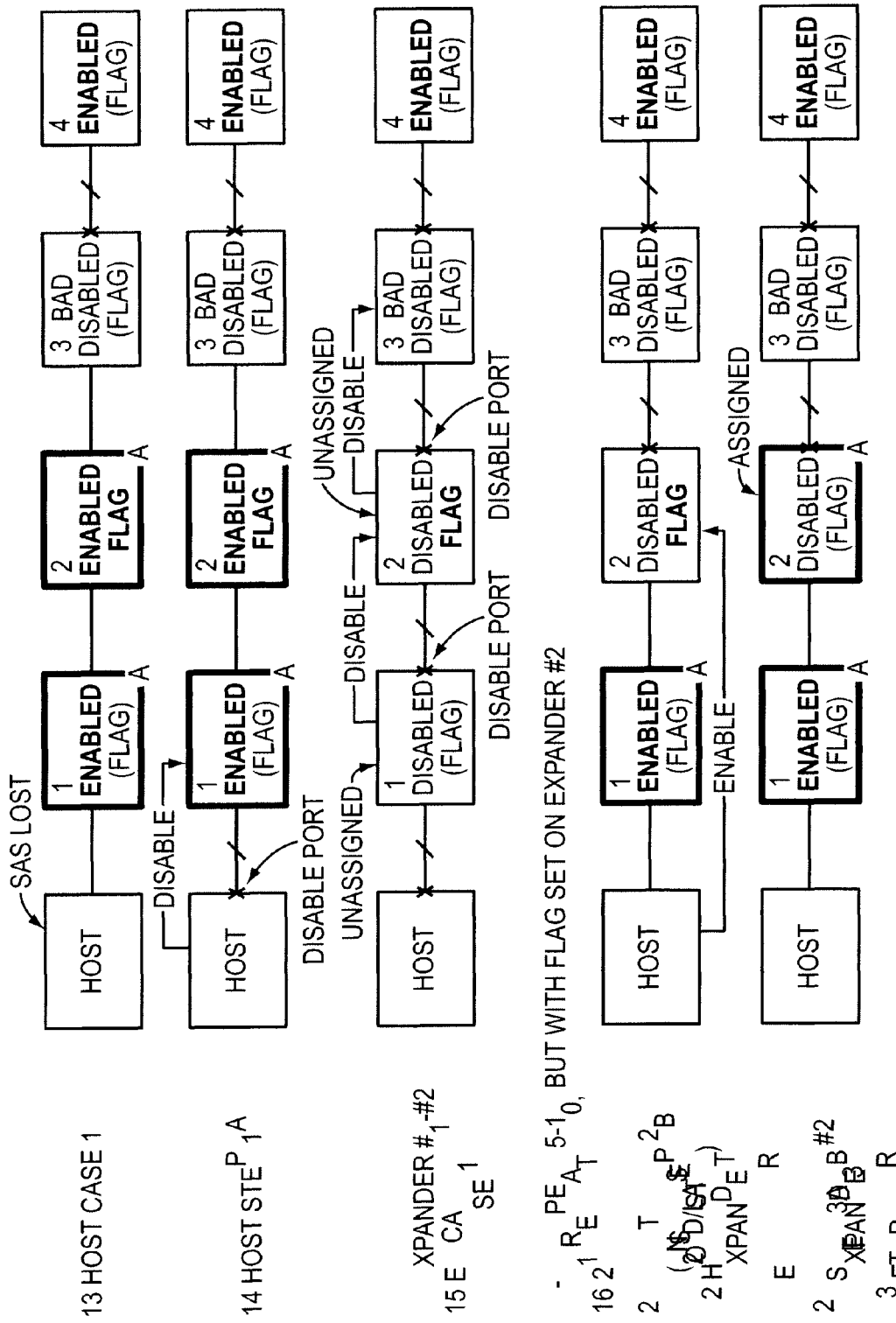

FIGS. 4A and 4B illustrate how these procedures work when an expander suddenly goes bad or when a chain containing a bad expander is plugged in. FIGS. 4A and 4B show a host correcting SAS LOST due to a bad expander. In Step 2 an expander goes bad on a previously good chain, or a chain with a bad expander was plugged in, so that the host gets SAS LOST. In step 3 the host disables its downstream port, SAS LOST, and the procedure returns to step 2. The remainder of the steps enable expanders one-by-one. The illustration is continued in FIG. 4B. In step 13 the host finally enables expander 2, which causes SAS LOST in step 15. This returns the host to step 2 in FIG. 4A, but with one difference: expander 2's FLAG is set. Therefore after repeating steps 2-11, the host reads expander 2's FLAG in step 26 and simply clear it rather than sending an ENABLE command as it did in step 13. Thus expander 3 and the following expanders are isolated.

More particularly, the process begins in FIG. 4A with a normal chain of ASSIGNED and ENABLED expanders. In step 2 the host sees a SAS LOST because expander 3 went bad, or perhaps the cable from expander #1 to #2 was just inserted. In step 3 the host begins recovery round 1 and disables all expanders by sending a DISABLE command that propagates down the chain and disabling its controller port. In step 4 all expanders except the last one become DISABLED and not ASSIGNED because they get a DISABLE command. In step 5 the host enables its port and sends ENABLE to each expander in turn, starting with the nearest one, each time it sees a new expander come online. The FLAG moves from expander 1 (in step 8) to expander 2 (in step 12). Round 1 finally ends when SAS LOST occurs again due to the bad expander (step 13).

In response the host begins round 2, again disabling its controller port, and all expanders become DISABLED and not ASSIGNED again in step 15. Step 15 is exactly like step 4 with an important difference: expander #2 has the FLAG because it was the last expander the host ENABLED before SAS LOST.

Upon seeing SAS LOST, the host goes back to the beginning again (steps 16-21), once more enabling each expander in turn. However when it sends an ENABLE to expander #2 that already has the FLAG (step 22), the expander just resets its FLAG and leaves itself DISABLED (it still becomes ASSIGNED, though). This prevents the bad expander 3 from coming online as it did in step 13. Since the host sees no new expanders, and SAS LOST didn't happen, the host has nothing more to do.

During this procedure, as soon as the host sends ENABLE to an expander, the expander becomes ASSIGNED and the host can begin to use it normally—it is not necessary for the host to be "aware" of the fact that it is in a recovery process or whether it is in the first or second iteration sending ENABLEs. However, as noted earlier, the host may wish to know it is recovery round 1 to avoid initiating I/O to ASSIGNED expanders that are likely to go offline again.

Bad Expander Removed and Replaced with Good Expander

Figure 5:
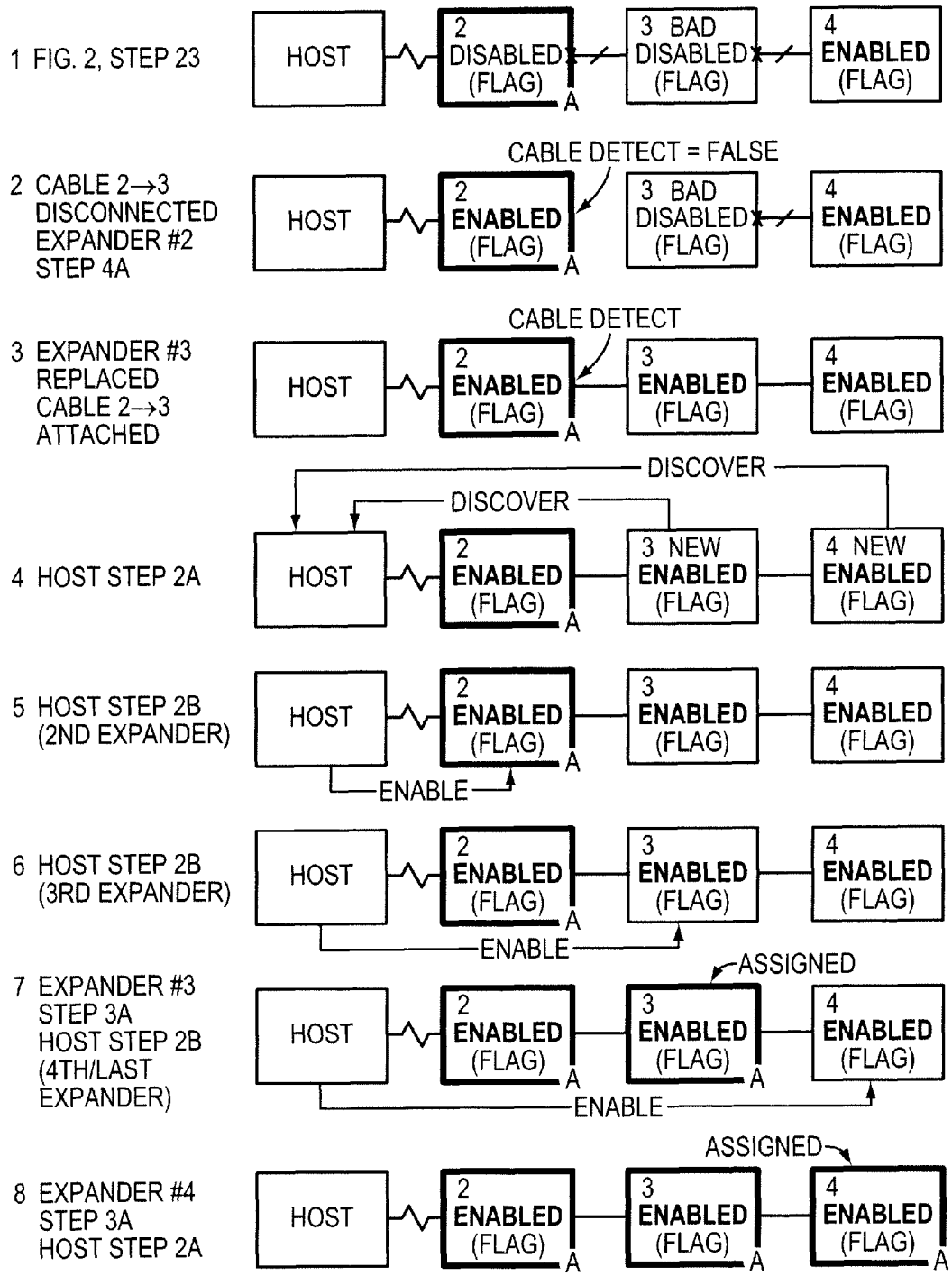

FIG. 5 illustrates handling a newly added good expander. These steps show that a new expander plugged in, and any expanders in the chain beyond it, are properly seen and ASSIGNED. This example starts with the situation at the end of FIG. 4B, where expanders #3 and #4 are isolated (expander #1 is not shown for brevity). The cable disconnect in step 2 enables expander #2, but does not propagate the disconnect upstream because the expander is already ASSIGNED. In the subsequent steps the host sees all the new expanders online, and sets each one ASSIGNED in turn by sending ENABLE commands.

More particularly, in FIG. 5, beginning with the state ending at FIG. 4B, a user disconnects the bad expander #3, replaces it with a good expander #3 connected to a good expander #4. When the cable is pulled from expander #2, it becomes ENABLED as shown in step 2. The new expander #3 must start out ENABLED due to Expander case 5 because it has no upstream cable.

When the cable is inserted in step 3, the host sees the new expanders and sends ENABLE commands to each one. This has no effect on previously ASSIGNED expanders, but eventually sets expanders #3 and #4 to ASSIGNED.

Details of Conditions

The following provides some more details on the conditions described above.

Phy power off/on (the state the expander sets on a phy).

When a phy is powered down (because the expander is powered down or because expander firmware powered down the phy) it looks to both this expander and the neighbor like there is no cable attached to this phy. When a phy on one end of a cable is powered down, neither expander can distinguish anything about the cable or its neighbor phy states. In this procedure, phys of powered-on expanders are always powered on except for the transient power off actions to propagate a loss of CABLE DETECT (expander cases 4 and 5).

Phy disabled/enabled (the state the expander sets on a powered-on phy).

This state applies only to powered-on phys. If the expander enables a phy, that means the phy is powered up and able to complete a SAS connection to its neighbor, enabling it to become ready defined below. If the expander disables a phy, the phy is still powered up, but does not transmit anything to its neighbor. However it can still receive SAS OOBs, in particular COMINIT, if the neighbor is enabled. If a phy in this state is plugged into an enabled neighbor phy, this expander will receive continuous COMINITs, one every half second, as the neighbor keeps trying to connect. This expander can observe these COMINITs on a disabled phy, thereby being able to detect if it is still plugged into an enabled neighbor.

While standard terminology considers a powered-off phy as disabled, "disabled" as used in this document implies it still has power to receive.

Phy ready/not ready (the state the expander observes on an enabled phy).

This state only applies to enabled phys. When a pair of enabled phys on neighboring expanders are cabled together, they exchange an OOB sequence, and within a few milliseconds both phys transition from not ready to ready, thus completing a live SAS connection. Both phys go not ready again when the cable is disconnected or when either phy is powered off or disabled.

While standard terminology considers a disabled phy as not ready, "not ready" as used herein means it is also enabled.

SAS COMINIT (the state the expander observes on a cable port).

TRUE for a port if no enabled phys are ready and at least one phy is receiving COMINITs at a regular rate. This can occur only if the neighbor has at least one enabled phy on the port.

Receipt of COMINIT on a phy is actually an event, not a state, so the SAS COMINIT state means that the event is occurring with some frequency. The implementation of this must be done carefully to help ensure that a brief period of not receiving COMINITs due to a neighbor glitch doesn't needlessly conclude SAS COMINIT=FALSE. Also, to conclude SAS COMINIT has transitioned to TRUE, the expander must help ensure that no phys are ready, and that it receives COMINITs at some minimum rate on at least one of those phys. The test for an individual phy is based on receiving COMINITs during every sampling period for a minimum period of time longer than it would take a pair of phys to become ready, thus ignoring individual COMINITs that occur transiently as phys become ready. This is to help ensure that SAS COMINIT does not momentarily become TRUE every time a phy is powered up or a cable is inserted.

Generally a transition to SAS COMINIT=FALSE occurs the instant any phy becomes ready, or if no phys are ready, after a certain amount of time has passed since any of the phys received a COMINIT while they were all not ready. This time must be longer than the interval at which a phy transmits COMINITs while trying to contact its neighbor (the hot-plug timeout, a default value of 500 ms).

At least one implementation has SAS COMINIT detection to detect cable pulls on ports.

CABLE DETECT (the state an expander or host observes on a cable port).

TRUE if at least one phy of a port is ready or the port is in SAS COMINIT state. This says the two neighbors are plugged into each other and have at least one common powered-on phy where the remote phy is enabled. The condition transitions from FALSE to TRUE the instant any pair of phys become ready (e.g., after a cable insert), or when the SAS COMINIT state is detected (it could also transition from FALSE to TRUE on receipt of a single COMINIT OOB on any phy). If CABLE DETECT was TRUE and any enabled phys of the port were ready, it transitions to FALSE when all local phys are powered off, or a certain amount of time after all enabled phys become not ready. The delay, greater than the time it takes a phy to start transmitting COMINITs after being disabled, gives the expander time to check for SAS COMINIT, to help ensure that the expander doesn't falsely conclude the cable was removed when actually the neighbor just disabled its phys for the purpose of sending COMINIT. This condition is observable regardless of, and unaffected by, the enabled or disabled states of the phys on either end. If the two expanders one the end of a cable have no powered-on phys in common (which includes the case where the local expander's phys are all powered off) both expanders will see CABLE DETECT=FALSE.

SAS LOST (the event host observes on a controller port).

The event that occurs when the host cannot see the first expander even though CABLE DETECT is TRUE and it has at least one enabled phy. SAS LOST does not occur if the host loses the first expander because CABLE DETECT went FALSE, if the host or first expander disables all its phys. Once SAS LOST occurs, it cannot occur again until CABLE DETECT goes FALSE, all phys get disabled, or the first expander is discovered.

At power-on, or when CABLE DETECT is FALSE, plugging in or powering up the first expander can cause a SAS LOST event if the host does not see that expander within a reasonable period of time after the first phy becomes ready. If no phy becomes ready, no SAS LOST condition can occur.

In an at least one type of enclosure known as an XPE, if someone pulls the cable to the first DAE, the host will soon panic, but by this definition pulling a cable does not cause a SAS LOST event.

Whether the SAS controller needs to implement the CABLE DETECT logic to distinguish between CABLE DETECT and all phys enabled but not ready, is left for the implementation. It's not actually that important except for fault diagnosis: if desired, the host that doesn't implement CABLE DETECT on its controller could assume SAS LOST occurs on a cable pull, too. This worst effect of this would be to create a useless warning (e.g., in the log) and initiate a useless recovery procedure.

On an DPE or XPE where the outbound cable is connected to an expander on the SP instead of the controller, it may not be necessary to implement CABLE DETECT at all, because there should never be a lack of CABLE DETECT unless that expander resets or fails to power up. Even without CABLE DETECT logic in the controller, SAS LOST in such a platform would only occur only if there was a bad expander.

The point of SAS LOST is to identify when the host should run the recovery procedures. In fact, SAS LOST could be defined to include broader conditions. See the Detecting SAS LOST discussion below.

Host Error Reporting

With respect to risk that the procedure will obscure or hamper error detection, because the bad expander is silently isolated, the recovery procedure cannot start unless the host gets SAS LOST, and in such a case the host should alert the user about the problem. Furthermore, because the bad expander does not come online, there will almost certainly be a fault LED on the enclosure or DPE due to missing drives or asymmetric cabling.

While the host cannot talk to the bad expander to find out its enclosure number or other identifying information, the host can indicate to the user the number of the last enclosure that was visible prior to SAS LOST, with a message indicating that the problem is likely due to attaching or powering up an enclosure beyond that last one.

Even better in at least some implementations, to avoid false alarms in case the recovery procedure succeeds in bringing all expanders online, is for the host to read the FLAG, ENABLED and downstream CABLE DETECT states of the last online expander prior to sending it an ENABLE command. If the FLAG and CABLE DETECT are set, but that expander is DISABLED, the host knows that there is a bad expander immediately downstream of the last one. While the host does not need to read any states to implement this procedure, a way to do so may be provided via SES for diagnostic purposes.

Also, unless both the A and B sides of the enclosure are bad, a problem with just one side will be seen by the SPs as asymmetrical cabling. If a procedure is retained that a specific implementation uses to prevent asymmetrically wired enclosures from coming online, the host will know which expander is causing the problem via the peer.

Upstream Power Off and ASSIGNED

Expander case 4a causes an expander that is not ASSIGNED to briefly power down its upstream port when a downstream cable is inserted (or the downstream neighbor is powered up). The assumption is this action, which takes the expander offline, does not cause any problems for the host because the expander is not yet ASSIGNED. However the expander may be online to a host, in the interval between the host's discovery of it and the host sending it an ENABLE command, a period that could span several seconds depending on ENABLE timing (see Oscillating Good/Bad Expander discussion for reasons ENABLE could be delayed). In at least some implementations host software must be aware of this possibility and not issue any alert or fault if an expander goes offline before receiving the ENABLE command. If the host is tracking the fact that it is a recovery procedure, it can know not to be concerned about this event.

In practice this timing window could be hit several times if users connect cables for multiple enclosures in order, from upstream to downstream, on a live system. (If users connect the most upstream cable last, this window will not be hit.) In at least some implementations host software must be robust enough to accommodate multiple (but no more than a handful) of such events before it sends ENABLE. The event can only occur during the interval between discovery and ENABLE, because the event does not propagate upstream of ASSIGNED expanders.

Host OS and POST

When a bad expander is in the chain, the host sees no expanders and must be robust enough to survive the recovery process in order to complete it. If a bad expander is plugged in at runtime, the chain will go down while disks are online. If this chain contains the operating system's boot drives, it could cause the OS to panic. This panic must be delayed until after recovery has completed, or at least until it has progressed far enough to bring the first expander online. Then when the system reboots, the host will see just that first expander. This will be sufficient to get the host OS restarted, and from there the host can send an ENABLE command, continuing to send them as additional expanders come online, until the bad expander is again in the chain, bringing the entire chain down again and once more causing the OS to panic. But this second time the last good expander has the FLAG. The next time the OS reboots, it will send ENABLE commands as before but the bad expander won't come online.

Of course, it would be better if the OS did not panic in the first place, but the above shows that even if it does, it will eventually run OK as long as the host has enough time to send a DISABLE command to the first expander. Clearly multiple panics are quite disruptive, but less disruptive than being unable to boot at all due to a bad expander.

With respect to POST or BIOS, which needs to access the back end to boot the OS, if there is a bad expander in the chain at reboot time, the OS may never boot. Clearly it is necessary to handle a bad expander at this time. POST could, of course, implement the host procedure described herein. But there is a shortcut: POST only needs access to the boot drives, which are typically attached to the first expander in the chain. So if POST cannot get access to the back end, it could send a DISABLE to shut off all expanders, but not disable the downstream port of its controller, so it will see the first expander (if it is good). POST doesn't need to disable its port or send any ENABLEs. From there, it can boot normally from the first expander, and the OS, once running, will implement the rest of the recovery procedure to bring additional expanders online.

Oscillating Good/Bad Expander

This procedure assumes that once an expander goes bad, it stays bad. In at least some implementations, if it goes good again later, the procedure will not detect that and will leave it offline (unless it is reset or re-plugged so it will trigger the cable disconnect logic in expander cases 4 and 5). However, if an expander alternately goes bad and good at just the right rate, the recovery procedure may loop indefinitely. In the example in FIG. 4A, if expander #3 is initially bad and then becomes good anytime before step 12, it will come online when expander #2 in step 12 is ENABLED. As a result of seeing a new expander come online, the host will eventually send expander #2 another ENABLE, thereby clearing its FLAG. If expander #3 goes bad again after this, the whole process will repeat. In more general terms, a bad expander that transitions to good every time it comes online, and then to bad again after the host has cleared the FLAG in the previous expander, will cause the process to iterate endlessly.

This problem could occur because of a bug in the expander causing it to go bad, that is provoked by some exchange with the host that always occurs soon after bringing the enclosure online. Then when the expander goes offline, it becomes "good" again. This kind of problem could be significantly alleviated by having the host defer its case 2 on page 10 where it sends ENABLEs after seeing a new expander come online, until after all new enclosures have been brought online in a normal manner, thereby giving any new expanders a chance to go bad again before clearing the proceeding expander's FLAG.

One concern with delaying ENABLE too long after an expander comes online, is that a cable insert downstream of the expander could propagate upstream to this expander before it is ASSIGNED, causing it to go offline again when it powers down its upstream port (expander case 4a). This is harmless if the expander hasn't yet been brought up to the point where it is being used for I/O. Therefore any intentional delay for this purpose should help ensure that ENABLE is sent before the point where the host would misinterpret the loss of connectivity as a drive or enclosure failure.

Detecting SAS LOST

An important issue is how the host actually detects SAS LOST. The definition given above only involves low level SAS discovery issues, where the host can easily determine from its controllers what expanders are currently visible. But the definition can be broadened to include any misbehavior by an expander that could cause the host to behave in an undesirable way. It is up to the host to define what triggers this event and nothing in this procedure depends on the precise criteria. As long as the host can reliably and consistently detect SAS LOST (and does not get any false alarms), any definition works.

For example, perhaps an expander, or drives in its enclosure, are behaving in a way that allows the host to see expanders, but no drives. Or perhaps the expander is returning an inconsistent SES state that (due to bugs in the host) is confusing the host and risking system instability. Of course, the bugs should be fixed so that the host can protect itself from a such a bad expander, but in an emergency, if the host can detect this has happened it can consider this to be a SAS LOST event in order to isolate that expander.

SAS LOST is defined as an event and not a state because this procedure does not require the host to know when the condition that triggered it has gone away. To that end, SAS LOST could be based on observing an undesirable event such as an unexpected unit attention or a bus reset, that is known to cause problems for the host (e.g., performance) even if the host can still access expanders, as long as that event was caused by a particular expander, where removing that expander would have prevented the event from occurring. Of course the harm caused by disabling the entire chain could be greater than the harm done by the bad expander, so the decision to broaden the SAS LOST condition to include functioning, albeit limping, environments should be considered carefully.

Note that if the chain is functioning well enough to determine which expander is causing the problem, the host can easily isolate the bad expander by disabling the phys of the expander upstream of it rather than using this recovery procedure. It is therefore useless to define SAS LOST to include cases where the host can identify the last good expander.

Branching Topologies

The procedure and/or aspects related to it can be extended to work in a branching topology, where an expander has more than one downstream port, but it requires extensions to allow the ENABLE command to specify which downstream port should be enabled, and the expander needs to separately keep track of the ENABLED state and FLAG for each port. However, there is still just one ASSIGNED state per expander, since that state only controls whether downstream CABLE DETECT gets propagated upstream. When the host disables its own port, all expanders disable all their downstream ports.

Then the host proceeds with the procedure one branch at a time, depth first, until it finds the bad expander.

In this approach the host needs a way to determine which port to specify in the ENABLE command it sends to a multi-ported expander. It can do this by reading the status of the expander and determining which ports are not yet ENABLED. When a new expander at the end of the tree comes online, the host needs to send a separate ENABLE command to each downstream port of each expander.

In order to leave open the potential for branching topologies, the syntax of the SES ENABLE commands should provide a field identifying the downstream port, and if a request is provided to read the FLAG it should identify the port with which the FLAG is associated.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in handling SAS topology problems, comprising:
    detecting that a chain of SAS expanders has a bad expander that prevents communicating normal SAS data streams along the chain;
    disabling all expanders in the chain;
    enabling expanders in turn while updating a flag indicating the most recently enabled good expander, until the chain fails;
    disabling all expanders in the chain; and
    enabling expanders in turn but stopping after enabling the expander indicated by the flag.

2. The method of claim 1, wherein at least one of the expanders is disabled by use of a disable signal that is transmitted by sending COMINITs more often than an enabled phy normally transmits COMINITs when trying to make a connection.

3. The method of claim 1, wherein at least one of the expanders is disabled by use of a disable signal such that the expander receiving the disable signal on an upstream port is able to distinguish the disable signal from a pulled cable or a powering off.

4. The method of claim 1, wherein at least one of the expanders is disabled by use of a disable signal that comprises issuing a custom SMP message just prior to disabling a port.

5. The method of claim 1, wherein at least one of the expanders is disabled by use of a disable signal that comprises issuing a standard SMP message with custom options.

6. The method of claim 5, wherein the SMP message writes a GPIO register.

7. The method of claim 1, wherein at least one of the expanders is disabled by use of a disable signal that comprises use of a SAS primitive not normally used for an expander-to-expander link.

8. The method of claim 1, further comprising:
    isolating the bad expander in a SAS domain.

9. The method of claim 1, further comprising:
    helping to prevent the bad expander from affecting a component that is upstream in a SAS domain.

10. The method of claim 1, wherein at least one of the expanders is disabled by use of a disable signal that is sent by a host on a downstream port of the host.

11. The method of claim 1, wherein at least one of the expanders is disabled by use of a disable signal that is sent by another expander on a downstream port of the other expander.

12. The method of claim 1, wherein at least one of the expanders is disabled by use of a disable signal that is propagated to the end of the chain so that all expanders in the chain have disabled their downstream ports.

13. The method of claim 1, wherein a last good expander saves the flag indicating the last good expander was the last expander that the host enabled.

14. The method of claim 1, wherein at least one of the expanders, in response to a disable signal, sends another disable signal to another one of the expanders.

15. The method of claim 1, wherein the flag in effect propagates downstream, and is always set in the last expander to come online.

16. A system for use in handling SAS topology problems, comprising:
    first logic detecting that a chain of SAS expanders has a bad expander that prevents communicating normal SAS data streams along the chain;
    second logic disabling all expanders in the chain;
    third logic enabling expanders in turn while updating a flag indicating the most recently enabled good expander, until the chain fails;
    fourth logic disabling all expanders in the chain; and
    fifth logic enabling expanders in turn but stopping after enabling the expander indicated by the flag.

17. The system of claim 16, wherein at least one of the expanders is disabled by use of a disable signal that is transmitted by sending COMINITs more often than an enabled phy normally transmits COMINITs when trying to make a connection.

18. The system of claim 16, wherein at least one of the expanders is disabled by use of a disable signal such that the expander receiving the disable signal on an upstream port is able to distinguish the disable signal from a pulled cable or a powering off.

19. The system of claim 16, wherein at least one of the expanders is disabled by use of a disable signal that comprises issuing a custom SMP message just prior to disabling a port.

20. The system of claim 16, wherein at least one of the expanders is disabled by use of a disable signal that comprises issuing a standard SMP message with custom options.

* * * * *